(12) United States Patent
Kwan (10) Patent No.: US 6,990,467 B1
(45) Date of Patent: Jan. 24, 2006

(54) METHOD, APPARATUS AND PROGRAM FOR PRICING, TRANSFERRING, BUYING, SELLING AND EXERCISING OF FREIGHT CARGO OPTIONS ON THE WORLD WIDE WEB

(76) Inventor: Khai Hee Kwan, P.O. Box 1178, Sandakan, Sabah, 90713 (MY)

( * ) Notice: Subject to any disclaimer, the term of this patent is extended or adjusted under 35 U.S.C. 154(b) by 0 days.

(21) Appl. No.: 09/376,381

(22) Filed: Aug. 18, 1999

(51) Int. Cl.
*G06F 17/60* (2006.01)

(52) U.S. Cl. .............................. 705/37; 705/35; 705/39; 705/40

(58) Field of Classification Search .................. 705/36, 705/5, 26, 37, 1, 14, 4, 42; 104/281; 463/42; 370/252; 379/215.01, 266.01, 88.22; 709/226; 725/110
See application file for complete search history.

(56) References Cited

U.S. PATENT DOCUMENTS

| | | | | |
|---|---|---|---|---|
| 5,671,363 A | * | 9/1997 | Cristofich et al. | 705/37 |
| 5,724,524 A | * | 3/1998 | Hunt et al. | 705/37 |
| 5,752,238 A | * | 5/1998 | Dedrick | 705/14 |
| 5,797,127 A | * | 8/1998 | Walker et al. | 705/5 |
| 5,822,736 A | * | 10/1998 | Hartman et al. | 705/1 |
| 5,956,691 A | * | 9/1999 | Powers | 705/4 |
| 6,035,289 A | * | 3/2000 | Chou et al. | 705/37 |
| 6,085,169 A | * | 7/2000 | Walker et al. | 705/26 |
| 6,131,087 A | * | 10/2000 | Luke et al. | 705/26 |
| 6,151,588 A | * | 11/2000 | Tozzoli et al. | 705/37 |
| 6,263,321 B1 | * | 7/2001 | Daughtery, III | 705/36 |
| 6,487,552 B1 | * | 11/2002 | Lei et al. | 707/4 |

FOREIGN PATENT DOCUMENTS

JP   06150163 A  *  5/1994

OTHER PUBLICATIONS

Toby D. Gooley, Shipping without Borders, Logistics Management and Distribution Report, Radnor, PA, Jan. 1998, vol. 37, Iss. 1; p. 77, 3 pgs.*

* cited by examiner

*Primary Examiner*—Frantzy Poinvil
*Assistant Examiner*—Debra F. Charles (57) ABSTRACT

An apparatus, method and program for determining the price of an option to pay for or sell cargo freight facility on the Internet and for facilitating the sale and exercise of those options including the underlying contract which is made transferable. By purchasing an option, a customer can lock in a specified freight cost without tying up his money and without risking the higher cost fee if there is a rise later. Pricing of these options may be based on several criterion including, date of departure, type of cargo and so on. By selling such option, the carriers will have extra cash flow and reliability.

17 Claims, 8 Drawing Sheets

NOTE TO INTERNET USERS, YOU HAVE TO REGISTER FIRST BEFORE USING.

(CLICK HERE TO REGISTER)

REGISTERED USERS PLEASE SIGNED IN. THIS IS A SECURED WEBSITE.

NAME [                                    ]

PASSWORD [                                ]

AGAIN TO CONFIRM [                        ]

BUY  [ SELECT TYPE OF OPTIONS ]

SELL [ SELECT TYPE OF OPTIONS ]

☐ TICK HERE TO SHOW YOUR PORTFOLIO  [ PRESS RETURN ]

NO PASSWORD IS REQUIRED FOR SERVICES BELOW.
PLEASE FEEL FREE TO BROWSE OUR SITE. YOUR FEEDBACK IS IMPORTANT TO US.

BROWSE [ ALL OR CLICK TO SELECT ]

LIST OF INSTITUTIONS [ CLICK TO SELECT ]

FEEDBACK

FORGOT YOUR PASSWORD AND USER NAME ? USE OUR FORM HERE

FIG 8

METHOD, APPARATUS AND PROGRAM FOR PRICING, TRANSFERRING, BUYING, SELLING AND EXERCISING OF FREIGHT CARGO OPTIONS ON THE WORLD WIDE WEB

REFERENCE TO A MICROFICHE APPENDIX

Not Applicable.

TECHNICAL FIELD

This invention advantageously relates to a method, apparatus and program for pricing, transferring, buying, selling and exercising options for freight services using the World Wide Web interface.

BACKGROUND OF THE INVENTION

The present invention relates to the field of originating, pricing, transferring, buying, and selling of options for freight services on the Internet using a web based interface in the form of an exchange model. Basically, the exchange model, which primarily consists of the web interface, is installed at a server which is then link to individual freight carriers' system that wish to provide such a service. Freight fees, particularly in air-cargo are constantly changing as well as rising, with availability subject to present economic situation. Unfortunately at this time, there is neither system nor device for managing the risk of these fees. There are also no exchanges that provide a market for these options to be sold or bought or written if they should come into existence. By using an option, one is guaranteed the exact remaining payment when one wishes to exercise the option. Options contract for freight cargo has to be standardised in terms of units, route and frequency although not perfectly similar. The providers of freight services will also benefit since the need to accurately forecast supply has diminished since the market participants are deciding all the actual demand. Carriers will also be more informed and profitable since option premium payments are up-front payments enhancing cash flow where the clients decided not to exercise them.

Option contracts ("Option"), are known in other fields as a way of locking in a particular purchasing price for a given commodity. Because of this, options can be used by buyers to minimise the risk of rising prices and sellers for falling prices. One of the most widely known types of options is the covered option to purchase stocks or company securities. The issuer of this type of option owns a number of shares of a particular stock. The buyer of this type of option has the right to purchase from the issuer of the options, a predetermined number of shares of the stock, at a predetermined price, at any time before the option expires. This "style" is usually called the American Option while the European Option means, the buyer can only exercise at a fixed date as set out in the terms of sale of the option.

As explained earlier, there has been no acceptable way of minimising the risk of fluctuations in freight services cost and as far as I am aware, options to purchase or pay for freight facilities have never been sold or traded any where in the world. Moreover no system has been developed for determining prices for options for freight facilities and keeping track of the sale and exercise of these options. The current system uses a combination of hurdle rates, bid rate and cut-off price which has to be determined by the manager. Different rates are used to manage different 'desperation' points as the time approach for the carrier to depart.

BRIEF SUMMARY OF THE INVENTION

It is an object of this invention to provide an innovative way to manage freight fees by providing the method, apparatus and program for pricing, buying, selling and exercising options to pay for freight cargo facilities. This invention details the framework to cover four sectors, freight for space, air, rail and sea transports.

DESCRIPTION OF INVENTION

The Inventor has developed a method of utilising a telecommunications service system host computer connecting to various terminal system including Automatic Teller Machines (ATM) which is linked to a public telephony system network or through the Internet where applicable. The design is a modular web-based application that utilises the HTTP protocol that has been serving the Internet community since the emergence of the first websites. It is a 3-tier architecture and a very thin client that makes maintenance easy. The three layers are the Microsoft SQL Server 7.0 as the database server, a set of ActiveX components powered by the Microsoft Internet Information Server 4.0 and hosted by an NT Server 4.0 at the middle tier, and clients using web browsers at the front end. The combination of these is a secure, reliable and easy to maintain system in which a client/customers only needs a web browser and intranet/Internet connection to access the system. In addition, the HTTPS protocol could be used to support secure transactions. Implemented within an organisation, users can connect to the system using a computer in the same network or using a telephone line through the Dial-up connection, both using the TCP/IP protocol. Connected to the Internet, a user can reach the system from anywhere in the world.

Thus according to one embodiment of the invention there is provided, a process system comprising:
- receiving an incoming request from a terminal through the public telephony system network via a modem or through the Internet or any connecting interface suitable for this purpose,
- authenticate the users,
- respond with the appropriate welcoming message, inputting forms and wait for a response,
- prompted the user with the information provided
- after inputting and registering the desired information, this will be then sent to the central controller for processing. The sending process is through a telephone line or through the Internet interfacing with a modem. The central controller will query responsive carrier's system, wait for their replies and will process the information and sent a reply/response through the same way back to the user. The above process is repeated again until the user is satisfied with his results.

The system is also able to process the option price for the freight services and rank results on its desirability. Stored all inputted data and maintain a database for all actions taken during its process and those instructed by the users, for example purchasing the option or selling it later. In line with the database concept, it can also do search, match, rank as well any secondary functions within its program.

The present invention means the possibility of a new way to manage freight costs, to lock in the cost of freight for clients, valuing the services using options and a means to execute using an external communicating devices such as a terminal. It will also provide carriers an opportunity to seek "risk adjusted" self-financing by reaching their potential clients at a reduced cost. For these clients, an opportunity to minimise but not eliminate the risk of freight services availability as well.

DESCRIPTION IN DETAIL OF THE PREFERRED EMBODIMENTS

The present invention is directed to a system to determining an appropriate price for options to purchase freight services and facilitating the sale and the exercising of the options.

The traditional methods of determining prices for options on stocks and traditional commodities are not suited in the freight services market. To begin with (1) the services is only supplied by a limited of companies; (2) the product is not completely fungible because certain potential users may prefer certain carriers because of loyalty programs or simple because the destination is not accessible by other carriers and (3) the supply of the product is small because only a limited number of placement/space are available on any given time (4) in examples such as space and air, such services is certainly limited by weight as well as by size.

Figure 1:
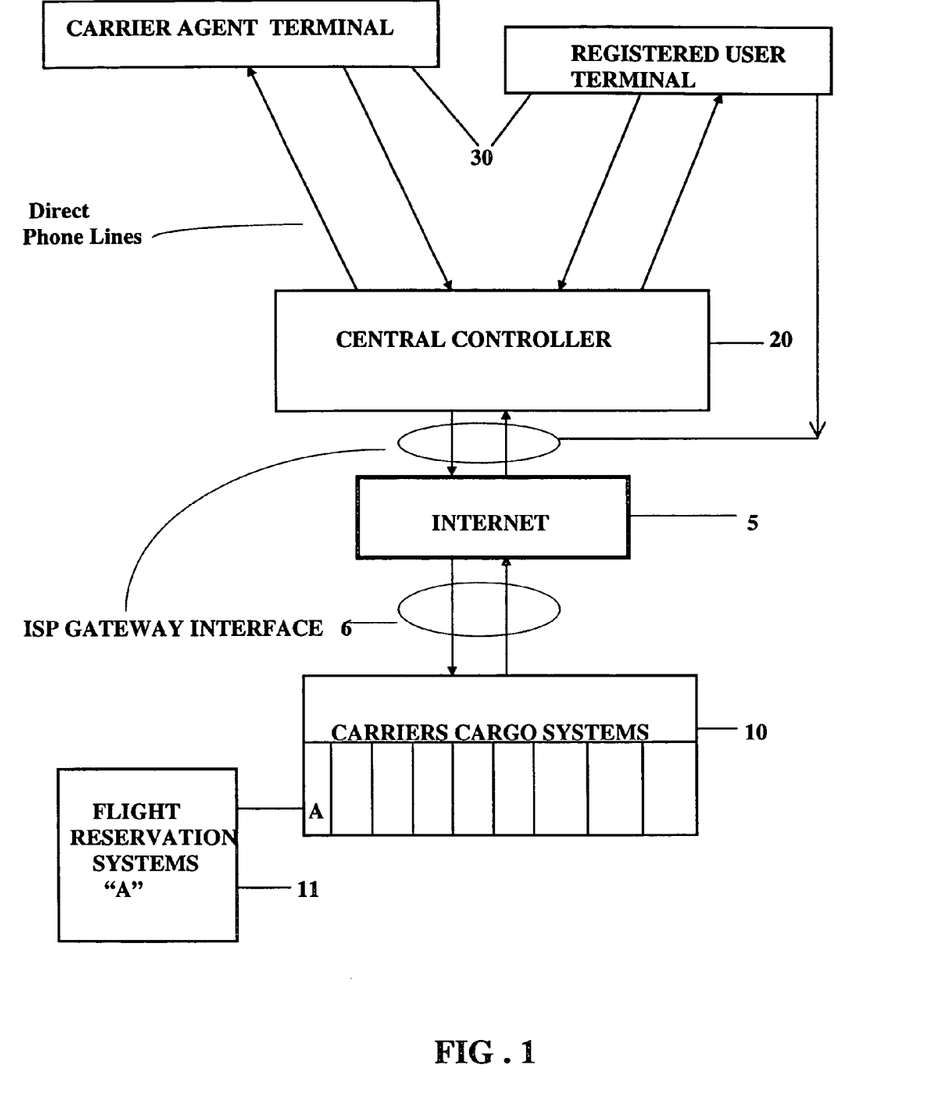
FIG. 1. Depicts the overall system block diagram of a preferred embodiment of the present invention.

FIG. 1 is an overall system block diagram of a preferred embodiment of the present invention. In this embodiment, central controller 20 is linked up to at least one freight agent ('agent') terminal 30 or registered user 30. This linked up can also be through the Internet through the Internet Service Provider (ISP) Gateway 6 or a network system whichever is preferable by the seller/provider at that time depending on economic costs of the system. Two terminals depicted in FIG. 1 but any number of agent/users terminals can be used including those linked via the Internet 5. The link between the terminal 30 and the central controller 20 does not have to be a physical link, it can, for example be a link via a modem, as described in the subsequent description, or any other telecommunication link including wireless systems. An option transaction can be initiated from any one of the agent/users terminals 30. The information required to implement the transaction is passed until the transaction is complete. The central controller 20 keeps track of all transactions including transactions in the system. Upon receiving a request, it will query all the participating carriers' cargo system in 10 for their interest, which may be automatic or manually controlled. This system is designed mainly for air cargo facilities which is dependent on passengers loading as well hence it will also query the Flight Reservation System "A" at 11. "A" refers to an unique system for different carriers. It must be understood for periods such as one year in advance, both systems at 11 and 10 will probably not able to response hence greater dependence will be placed on other variables such as forecasting results from historical data which are found in both systems. The system depicted in FIG. 1 may be embodied in hardware specially provided to implement the present invention. Alternatively, the system may be implemented using the infrastructure that already in existence such as using the ISP Gateway 6 interface.

Figure 2:
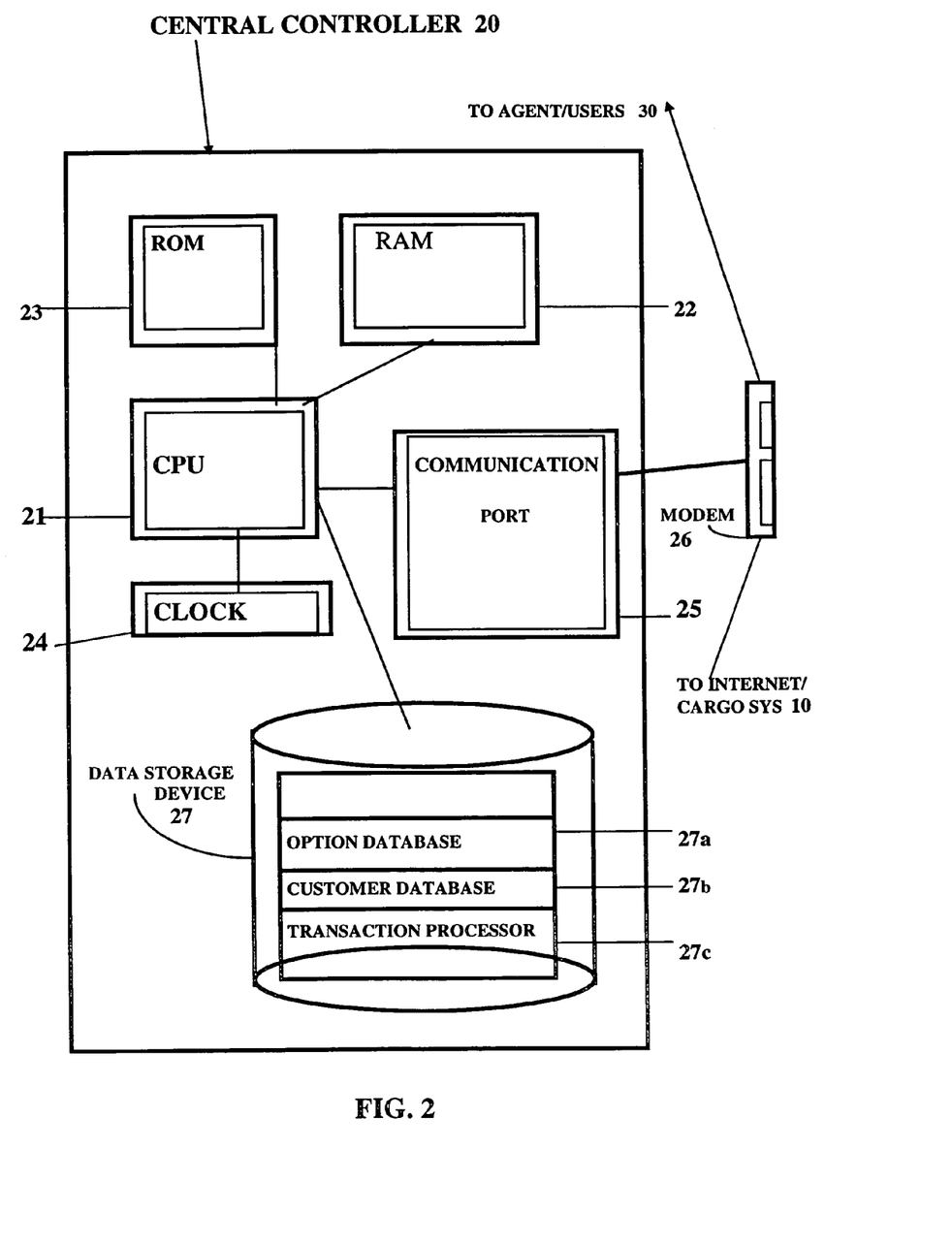
FIG. 2. Depicts the block diagram of the central controller

FIG. 2 is a block diagram of a preferred central controller 20. The central controller includes a CPU 21 which performs the processing functions of the controller. It is also includes a read only memory 22 (ROM) and a random access memory 23 (RAM). The ROM 22 is used to store at least some of the program instructions that are executed by the CPU 21 such as portions of the operating system or BIOS and the RAM 23 is used for temporary storage of data. A clock circuit 24 provides a clock signal. The use of a CPU 21 is in conjunction with ROM and RAM and a clock circuit. The central controller 20 also includes a communication port 25 which enables the CPU 21 to communicate and query with devices external to the central controller 20. In particular the communication port 25 facilitates communication between the modem 26 and the CPU 21, so that information arriving from the modem 26 can be processed by the CPU 21 and the CPU 21 can send information to remote location via the modem 26. Modem 26 is mainly use to connect to the Internet to reach the Cargo system 10 and agents/users' terminals 30. The CPU 21 can also store information to and read information from, the data storage device 27. This data storage device 27 includes an option database 27a and a customer database 27b, which are described below. In addition, it includes transaction processor instruction 27c which can be read by and executed by the CPU 21, thereby enabling the CPU 21 to process transactions. While FIG. 2 depicts separate option and customer databases, a single database that incorporates both of those functions may be used. This is described as mainly a Server environment.

Figure 3:
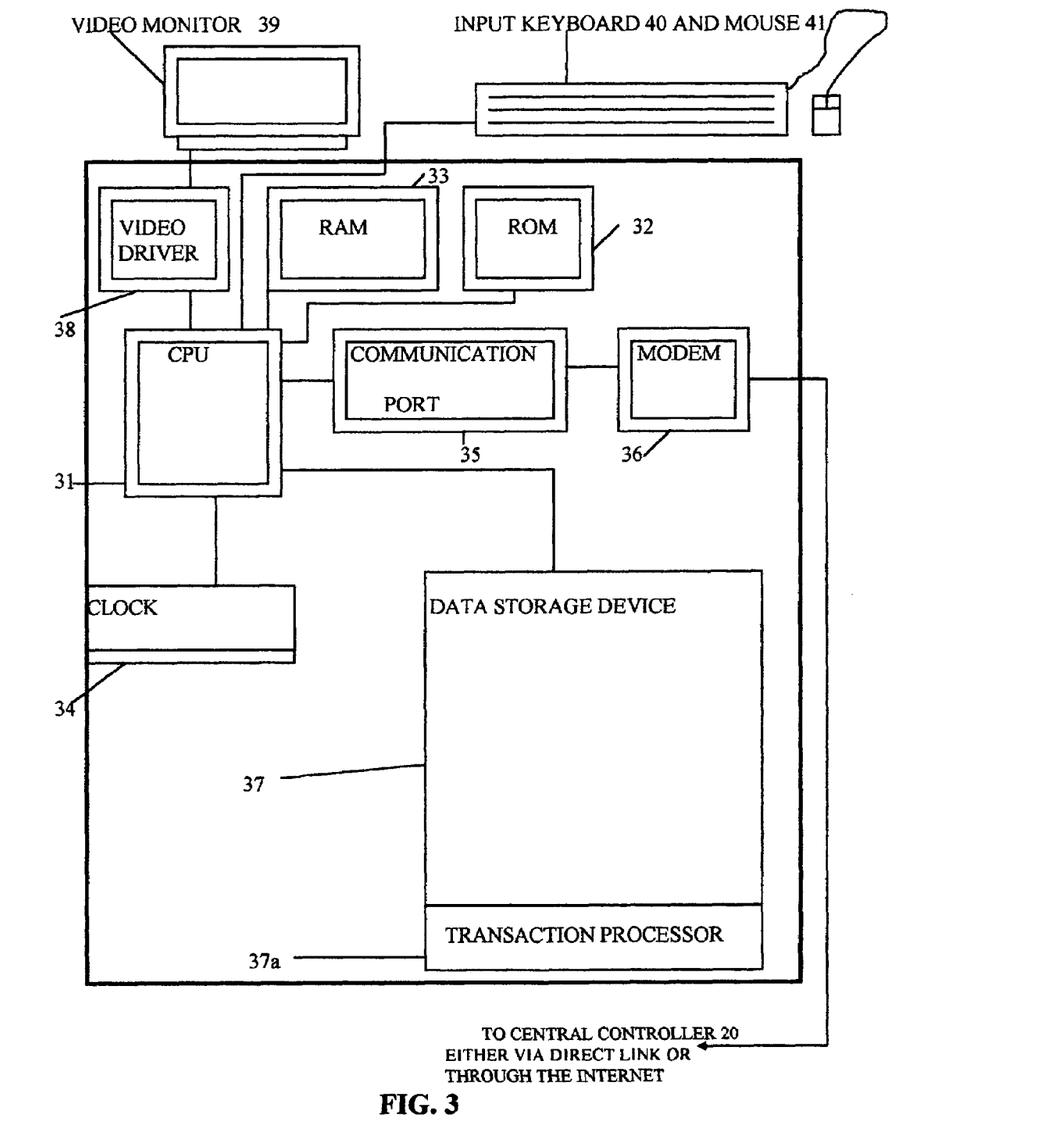
FIG. 3. Depicts the block diagram of the agent terminal and Internet connections.

FIG. 3 is a block diagram of a preferred agent terminal or in recognition to the above, a client environment, which can be located at the freight agency or even at a private home, or any establishment having the authority to lend itself to this network. As discussed there can be a number of agent terminals 30 linked to the one central controller 20 with each having the proper but different access authorities. Like the central controller describe above, the agent terminal 30 includes a CPU 31, ROM 32, RAM 33 and a clock circuit 34. The agent terminal 30 also include a communication port which interfaces with a modem 36 that facilitates communication between the agent terminal 30 and the central controller 20. Of course instead of a modem 36 other communication devices can be used as shown above for the central controller 20. A standard computer such as an IBM PC, Apple Macintosh, running appropriate custom designed software may be used as the agent terminal. The agent terminal 30 also includes an input device 40 to receive input from an operator. Any of a wide variety of input devices would be suitable including touch screen, mouse 41, keyboard 40. The input device 40 may interface directly with the CPU 31 as shown in the figure. Alternatively an appropriate interface circuit may be placed between the CPU 31 and the input device 40. The agent terminal 30 also includes a video monitor 39 for conveying information to the operator/user. The most preferred video monitor 39 is a LCD, LED and thin film transistor panels. A video driver 38 interfaces the CPU 31 to the video monitor 39 (or to any other type of video display device). The agent terminal 30 also includes a data storage device 37 in which transaction processor instructions 37a are stored. These instructions can be read by and executed by the CPU 31 thereby enabling the CPU 31 to process transactions.

Figure 4:
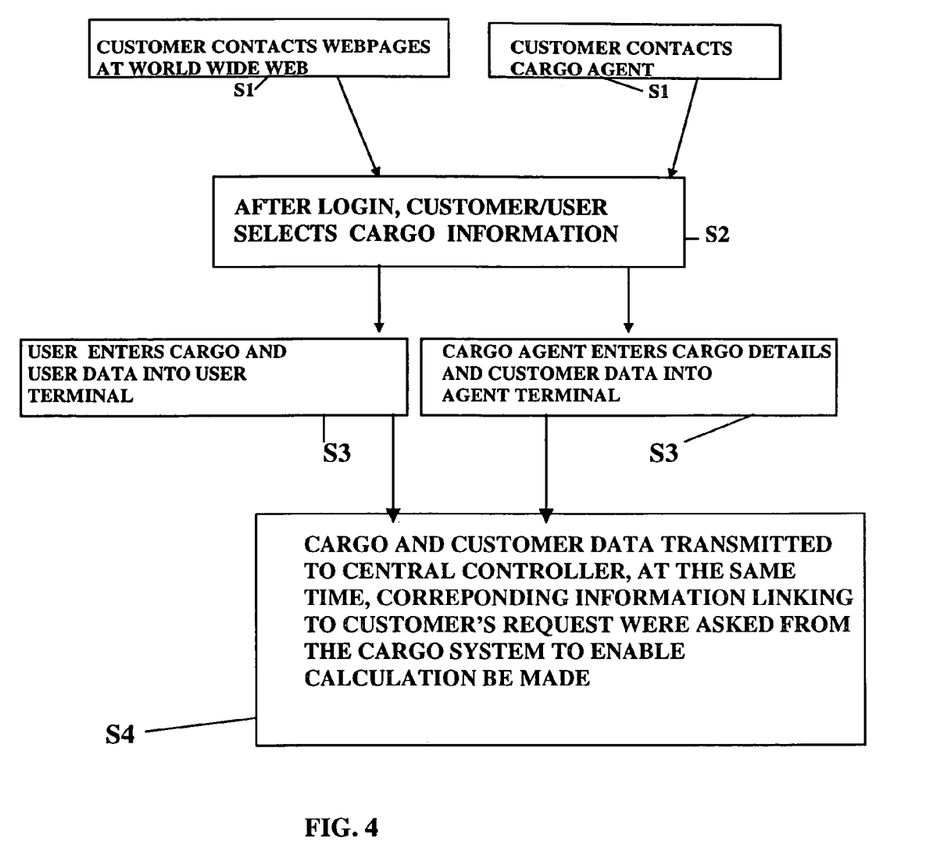
FIG. 4. Depicts the flow chart depicting initiations of a transaction in the agent terminal or through an Internet connection.

FIG. 4 is a flow chart depicting the initiation of a transaction-using agent terminal 30. The steps of the process shown in FIG. 4 may be implemented in a computer program that may be installed at the agent terminal alternatively as said, the terminal at the user level is merely a "dummy" console having access to the server at Central Controller 20. In fact, the computer program which is basically an query interface between User 30 and Cargo system 10 be installed at the Central Controller 20 from a computer readable medium and then stored therein in one or more of the ROM memory 22, RAM memory 23 and data storage device 27 for access and use by agent terminals with authority as required. The program described here is to enable an option price to be calculated. It is important to consider that the significance here is not just in presenting an option price to the user but to allow this price which is attached to a air-cargo facility to be freely traded in an exchange environment. In short, the user may purchase this option and do nothing, purchase and again offer it for sale in the same system to others, purchase and exercise it later. The process starts when a customer contacts a carrier provider such as the Singapore Airlines or its agent in step S1. Alternatively, a registered user can access it through the ISP Gateway 6 by using browser program by applying the command http://www.optionsys.com which will get connected to the central controller 20 (provided at that time the central controller 20 is connected to the ISP Gateway 6 as well) and where possible mirror sites are available for faster access. The customer selects the course information in step S2. This information comprises mainly of two components: the date of departure and route criteria. The date of departure criteria defines the time when the route is scheduled to begin. The route criteria refers to the actual route the customer is seeking to reach say from Sydney to Singapore, non-stop, plane type, size and weight, time of arrival, urgency, once a day etc. Such requirements may be different from carriers to carriers and indeed from customers to customers. The route information is entered by either the customer or by an agent, into the agent terminal 30 in step S3. Customer data such as the customer's name, address, and telephone number, handle if any, may also be entered into the agent terminal 30 in step S3. The route information and the customer data are then transmitted to the central controller 20 in step S4. The Central Controller 20 upon receiving this information will sent a simultaneous request to Cargo System 10. S4 also includes the step where corresponding information matching the criterion by customer/user data are requested from Cargo System 10 and are received.

Returning to FIG. 3, each of the steps S1–S4 described above are executed by the CPU 31 which is executing transaction processor instructions 37a stored in data storage device 37. The communication with the central controller 20 takes place via the communication port 35 and modem 36 or as the case may be, with Internet 5 through ISP Gateway Interface 6.

Figure 5:
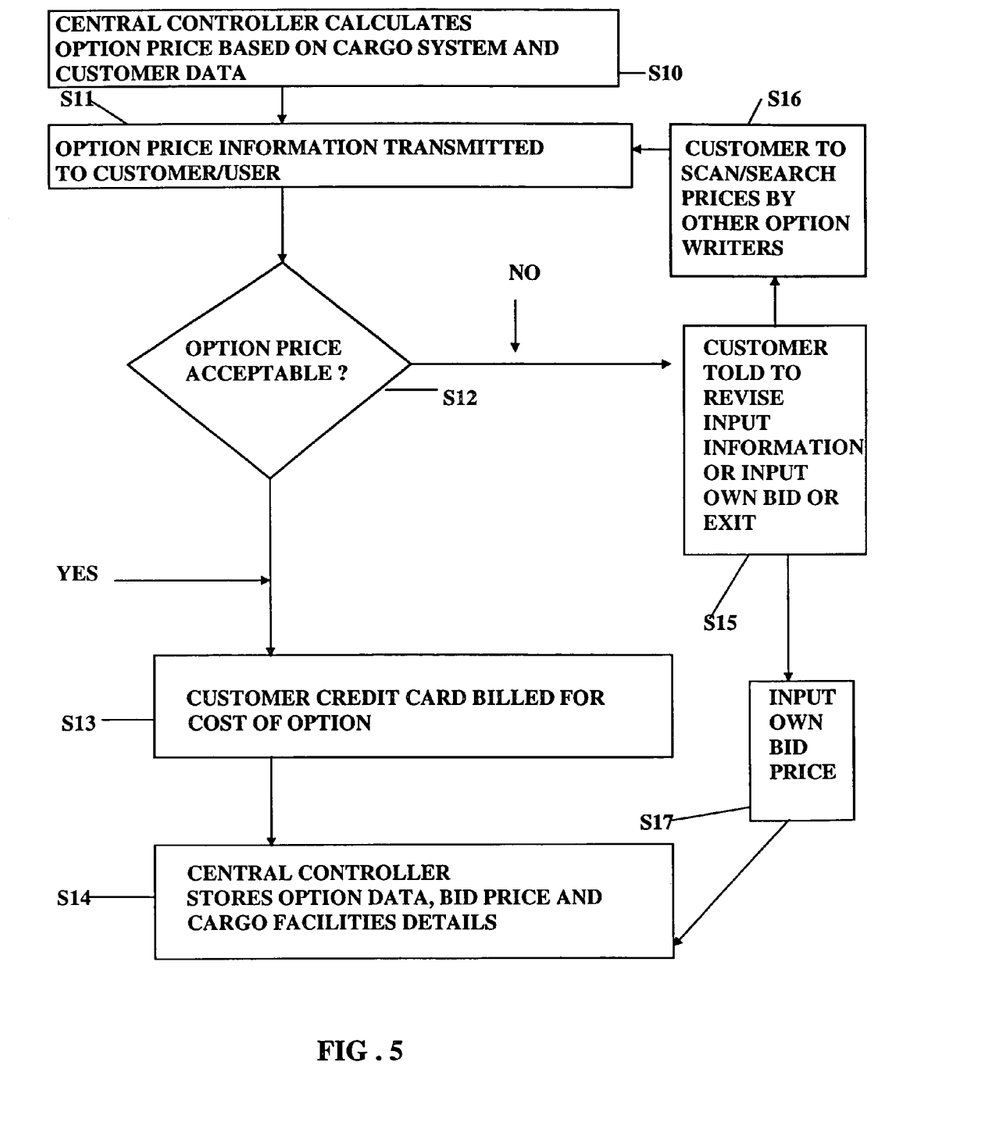
FIG. 5. Depicts the flow chart depicting the operation of controller and the final phase of operation of agent terminal.

FIG. 5 is a flow chart of the operation of the central controller 20 after receiving of route information from the agent/user terminal 30 and corresponding information from carrier cargo system 10. The steps of the process shown in FIG. 5 may be implemented in a computer program that may be installed in the central controller 20 from a computer readable medium and then stored therein in one or more of the ROM 22, the RAM 23 and the data storage device 27 (shown in FIG. 2). The central controller 20 calculates the price of an option in step S10 based on the route information received from the agent terminal together with information from the option database 27a and data received from the Carrier cargo systems 10 including those linked to the Flight Reservation System 11. The point "A" refers to a particular Flight Reservation System.

When the route information includes similar routes being offered by the various carriers, the price of the option may be simply the lowest price from a set of individual options unless the customer specifically ask for the unique carrier. As the case may be, prior entities including users who have purchased options having indicated their willingness to sell a similar option at a price of their choice, this options and the selling price will be submitted and displayed to the user at the same time. All options offered should be covered.

Expanding the case for air cargo, the calculation of the option price may be determined by multiplying a series of factors as refined from time to time which will affect the value of the options. The main deciding factor is the loading capacity (LC) of the chosen carrier, which may be a fraction of the price for which the option is being purchased for example 18 percent. Generally the fraction will decrease as the service-route fees for which the option was purchased approaches the full price or near the expiring date. There are according to this invention many ways of calculating the value and as such these methods are only for demonstration purposes. In the final product, a combination of a few of the methods will be applied. In the final analysis, those most responsive will be adopted and refine while those which are not will be abandoned.

The following includes the main variables used.

LC A base factor relating to loading capacity from passengers booking/reservation list for the scheduled flight. If the scheduled flight is more than a year, then check old records to compare with minimum based rate of 0.13 Adopt which ever is higher.

| Loading capacity of the carrier chosen for this contract | less than ⅓ | 0.18 |
| --- | --- | --- |
| | greater than ⅓ less than ½ | 0.40 |
| | more than ½ less than ¾ | 0.67 |
| | more than ¾ less than ⅚ | 0.78 |
| | greater than ⅚ | 0.95 |

For LC more than ¾, D will be 1.0

D A factor relating to the number of weeks before departure. In this example D increases as the number of days increased

| 1 week | 1.0 |
| --- | --- |
| 3 weeks | 1.2 |
| 4 weeks | 1.5 |
| >4 weeks | 1.8 |

For LC more than ¾, D will be 1.0

L A factor related to the expected cargo space on the subject route. In this example, L increases as the expected demand increases, typically we assume that route such as from London to New York has a higher demand than others.

| High Demand | 1.2 |
| --- | --- |
| Medium | 1.0 |
| Low demand | 0.7 |

C A factor relating to the loyalty of the customer. For example, a customer who has shown a track record in the past following some loyalty programs will be regarded as excellent, a customer who has no record of any dealings with this carrier at all will be considered a low status.

| | |
|---|---|
| Excellent | 0.7 |
| Good | 0.8 |
| Average | 0.9 |
| Pass | 1.0 |
| Low | 1.1 |

R A factor related to the flexibility of the customer's route plans. For example, a customer who is willing to consider other routes or a later flight is considered as flexible.

| | |
|---|---|
| Flexible | 0.7 |
| Not Flexible | 1.1 |

V A factor relating to the historical volatility of freight cost/fees. In this example, V increases as price volatility increase as measure in standard deviation terms or SD increases. This takes into account the seasonal high-lows.

| | |
|---|---|
| Changing by more than 9 percent on a year to year basis | 1.3 |
| Some Changes of up to 8 percent on a year to year basis | 1.1 |
| Stable No Changes | 0.8 |

W As per our space cargo example, launching of a space shuttle or rocket can only be done during good weather and hence this plays into the equation as well. Hence the same way for any time of cargo schedule, weather is an important since flight cancellation means income lost.

| | |
|---|---|
| Forecasted good weather at date of departure | 1.1 |
| Forecasted normal weather at date of departure | 1.0 |
| Forecasted bad weather at date of departure | 0.9 |

T T signifies the timing. That is whether it is within school holiday or not. This is because if the period is during holiday, then in our air cargo example, more people will be flying hence less space available in the cargo for non-passenger cargo. This however is a question of management policy and may be different with each carrier. Some may elect to put more flights knowing that there is greater demand and hence compensate the space availability.

| | |
|---|---|
| T is assigned | 1.2 for holidays |
| T is assigned | 0.95 for other days |

Q signifies the type of cargo being carried such as whether it is perishable or otherwise.

| | |
|---|---|
| Q is assigned | 1.2 for perishable |
| Q is assigned | 0.95 for non-perishable |

A signifies the plane type. For example, in a large aircraft such as a Jumbo, there is more room for cargo

| | |
|---|---|
| A is assigned 0.9 | for "Jumbo" types |
| A is assigned 1.0 | for mid-range planes travelling short distance. |

CO refers to the number of competition on the same route within the same time frame of 48 hours.

| | |
|---|---|
| CO is assigned 0.86 | when competitors amount to greater than 3 |
| CO is assigned 0.92 | when competition is less than 3 |

Using these variables, a suitable algorithm for calculating an appropriate option price is as follows:

$$\text{Option Price} = LC*D*L*C*R*V*W*T*Q*A*CO$$

It should be mentioned that conditions and changes may be made to the above formula from time to time to reflect changes in the environment. Similarly, option pricing for space, land and sea cargo options will also be different since for example in space cargo, there is really no "passengers" yet so the factor T which refers to holiday or non-holiday period has no meaning. The above is only an example for demonstration purposely. More sophisticated and refined formula shall be used to arrive at a suitable option pricing model. Once the option price information has been calculated as shown above, it is transmitted to the customer in step S11 as per FIG. 5.

As an example, assume a customer wants to purchase an option for route Sydney to London base fee at USD 10,000 for 100 Kg (this standardisation should be the same for all contracts). Further assume that the particular flight as queried has passenger capacity (LC) of less than ⅓ hence (0.18) with departure date is 5 weeks from now (1.8), the route has a medium demand (L) of 1.0, he is a loyal customer (C) 0.7, he is not flexible (R) 1.1, the service fees standard deviation is stable (V) 0.8, weather is forecast to be normal (W) 1.0 and timing is not within the holiday session (T) 0.95. The cargo is non-perishable (0.95), the type of plane is a Jumbo (0.9) and there is no competition (0.92). The base option price is USD 10,000*0.18=USD 1800 and the final option price from one particular carrier is USD calculated as follows $$1800*1.8*1.0*0.7*1.1*0.8*1*0.95*0.95*0.9*0.92 = USD\ 1491.43$$

After the price information is transmitted to the customer in step S11, the customer decides whether to purchase the option in step S12. If he decides to purchase the option, the system can process the sale by billing the customer's credit card/account in step S13. Of course, alternate methods of payment may be used instead of a credit card, including payment by cash, credit, check, debit card and the like each consistent with monetary value equivalent to the above, as long as it is before the departure date or expiring date of the option. If the customer decided not to purchase an option during step S12, the customer is given a chance to revise the route information in step S15 or exit or input his own bid S17 or scan other bid/offers S16. It is important to recognise that this is an option exchange where there are options being sold by other entities other than the carriers. However what is more important is to recognise that carriers being members of this exchange when called or queried to make market, these carriers shall oblige and hence only then an exchange can exist. Entities other than carrier members create liquidity in the exchange by taking varies open positions. They are required to deposit a certain amount of margin before allowing to operate in this electronic exchange. Options are made transferable so to ensure these values are properly priced. All information pertaining to the particular option is shown so other interested parties should be aware if there is any special peculiarity. By default all options contract should be standardised within the meaning that they are exchangeable within all participating carriers. However, the business reality is that it can never be exactly the same. Carriers often try to distinguish this point in their service, for example. For the purpose of this exchange, the meaning shall take the form of a higher degree of tradability.

Furthermore, by manipulating the plans, the customer may be able to find an option that is suitably priced. He may also wish to put in his own bid S17 and let carriers that may be interested to make an offer or other options buyer may be interested to sell to him based on the above requirements S16. The system is designed to be flexible so that there is liquidity in the market to allow transactions to take place. He may also scan/search other offers by covered or non-covered option writers who are willing to sell a similar option if he is still not satisfied with what is available to him by the central controller 20. The credit card transaction may be carried out by the central controller 20 or by the agent terminal 30 with all records updated instantly. Transactions processed through the agent terminal 30 may be carried out using the same modem 36 that is used to communicate with the central controller 20. Alternatively an additional modem (not shown here) may be included in the agent terminal 30 to process the credit card transactions. Alternative the normal credit merchant account may be used to facilitate the transaction. After the sale is completed, the option database (27a in FIG. 2) is updated in step S14 to reflect the fact that a particular option has been sold. The number of cargo options sold for a particular carrier including or excluding passengers seats may be used by the system as a factor in determining the option price to be sold in the future, for example LC. More specifically, when the number of options outstanding for a given route rises, the price for subsequent purchase of similar options may be raised to compensate the carrier for the additional risk up to the point of the maximum capacity it can hold. In oversold position, carriers may have to purchase back these options to avoid adding another flight. Alternatively, clients may wish to purchase from another carriers or market sellers. In undersold positions, carriers may wish to purchase put options written by external parties. This is effectively a position where such parties are willing to pay only up to a certain price for such a service. For example a put position means selling a position to use a carrier services upon exercised by the carrier. Upon exercise of these put options, the writers/sellers have to purchase these contracts equivalent to the amount of KGs. For example, say the current rate is $10,000 and the put seller is willing to sell one contract for 100 kg at $2,000. The carrier upon buying it pays $2000 to the put seller and upon exercise, the put seller will need to pay the remainder $8000 instead of $10,000 so effectively a discount of $2000 was given.

The customer database (27b in FIG. 2) may also be updated to indicate that a particular customer has purchased or sold a given option. This customer database may be used for various purposes including billing, messaging and marketing particularly using Internet based technology such as electronic mails subject to authorisation by the customer.

Figure 6:
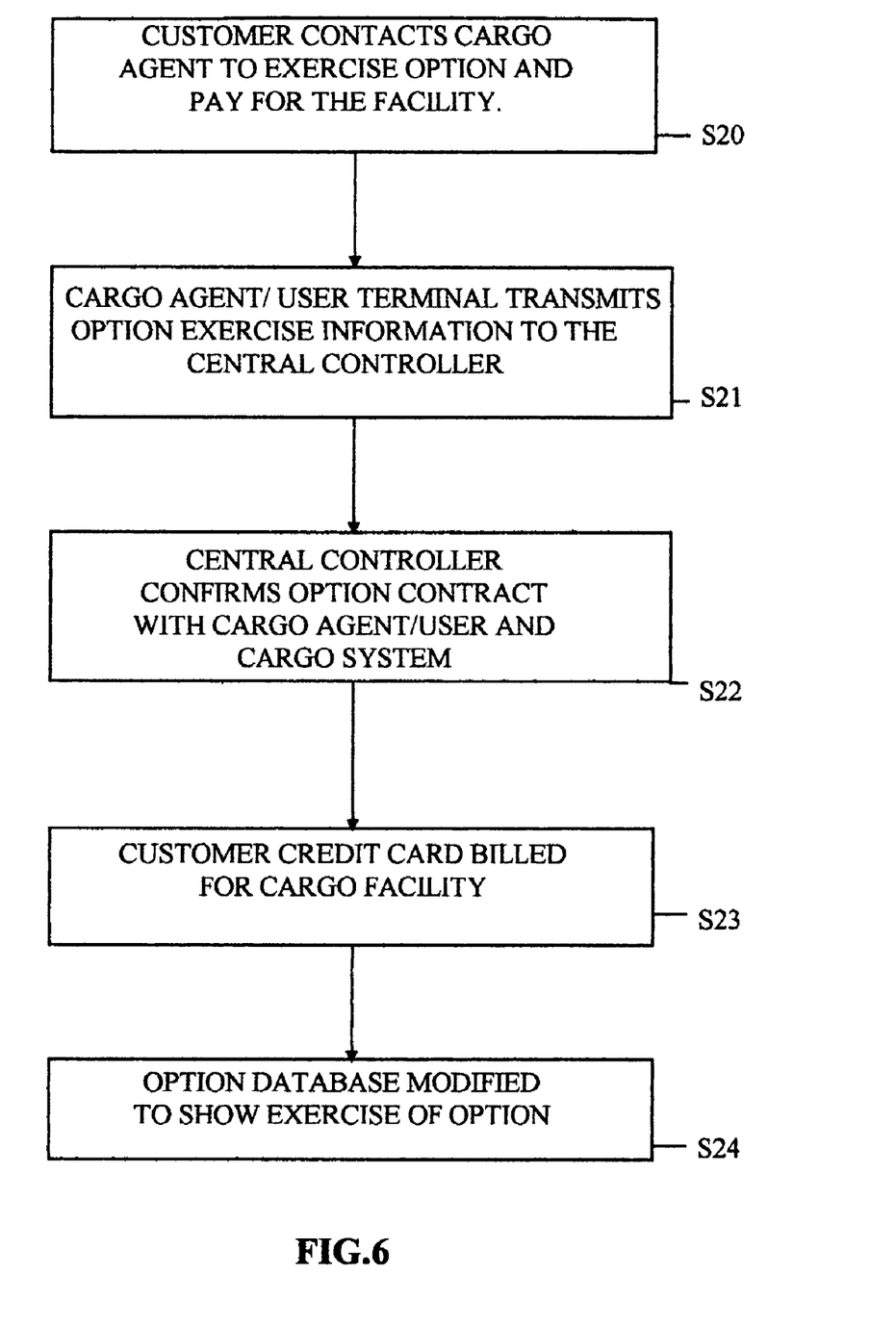
FIG. 6. Depicts a flow chart depicting the operation of the when an option is exercised.

FIG. 6 is a block diagram depicting operation of the system when a customer exercises an option. The steps of this process may be stored on a computer readable medium, which in this case would be the data storage devices 27 and 37 (shown in FIGS. 2 and 3). First, in step S20, the customer contacts the freight cargo agent and indicates that he wishes to exercise a previously purchase option. Alternatively, the registered user may try to access through the ISP Gateway 6 into the Internet 5 to link into the central controller 20. After the operator of the agent terminal 30 enters the information describing the option and customer details, the agent terminal 30 transmits the option exercise information to central controller 20 in step S21. The central controller 20 then confirms that the option contract does in fact exist and is current (not expired) as shown in step S22. The central controller 20 also informs the cargo system 10 that this option is to be exercised and as such it is crystallised to a contractual facility and hence obliged to complete its part of the contract by taking delivery of the cargo at the previously negotiated price. The customer's credit card is then billed for the facility specified by the option being exercised in step S23. The specifics of charging the customer for the route are similar to the specifics of charging the original purchase of the option. The option database 27a in the central controller 20 (shown in FIG. 2) is subsequently updated to show that the option has been exercised as shown in step S24.

Figure 7:
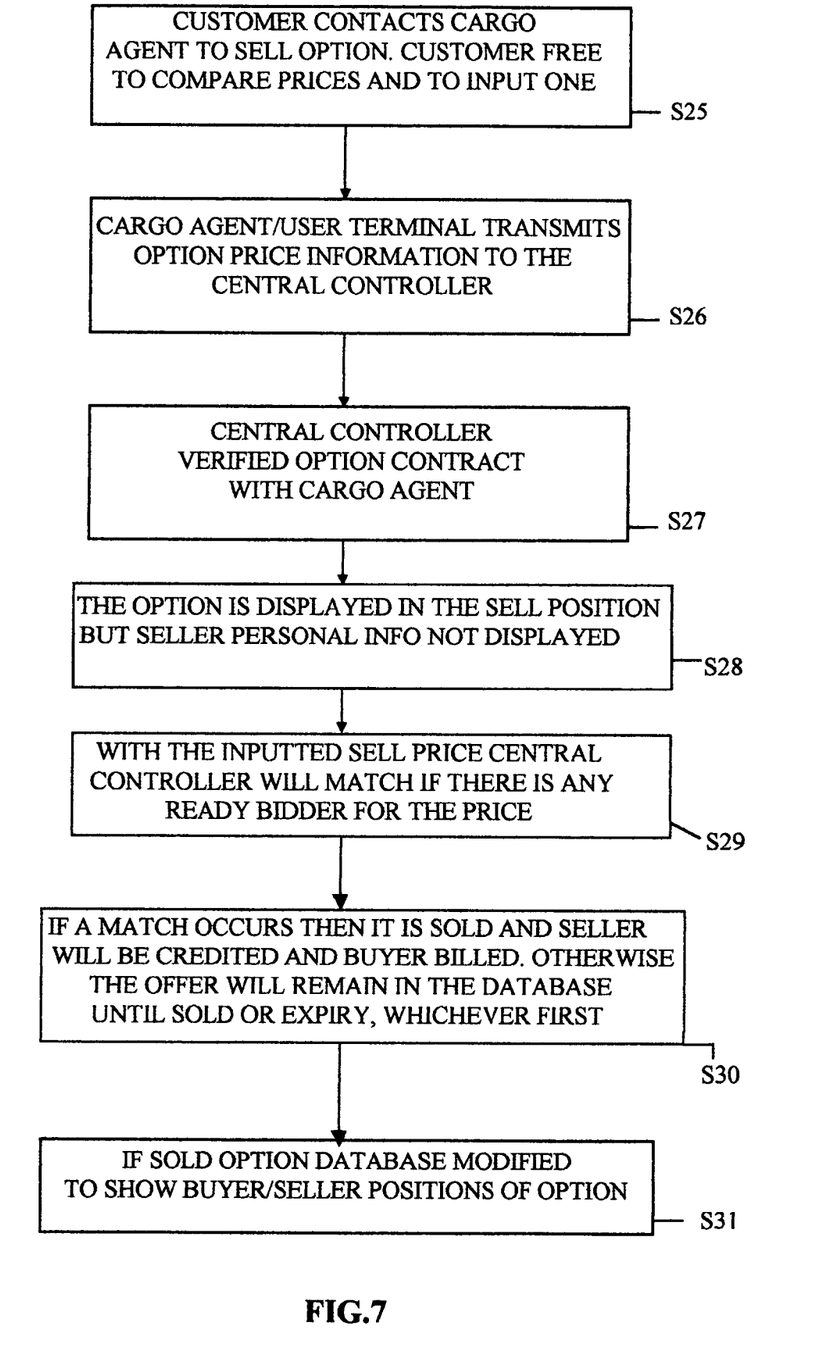
FIG. 7. Depicts a flow chart depicting the operation of an option being sold, marketed to be sold or match to be sold.

FIG. 7 is a block diagram depicting operation of the system when a customer wishes to sell an option. The steps of this process may be stored on a computer readable medium, which in this case would be the data storage devices 27 and 37 (shown in FIGS. 2 and 3). First, in step S25, the customer contacts the freight agent and indicates that he wishes to sell a previously purchase option for the particular route. After the operator of the agent terminal 30 enters the information describing the option and customer details, the agent terminal 30 transmits the option information to central controller 20 in step S26. The central controller 20 then confirms that the option contract does in fact exist and is current (not expired) as shown in step S27. The information pertaining to the sell is displayed for all to see S28. The central controller 20 will search the database 27a and match any ready bid for the option S29. If there is a match, then it is sold and the seller be credited and buyer be billed S30. Option database will be modified to show the change of ownership and obligation S31 otherwise unsold option will be stored until sold or expired whichever come first S30.

Figure 8:
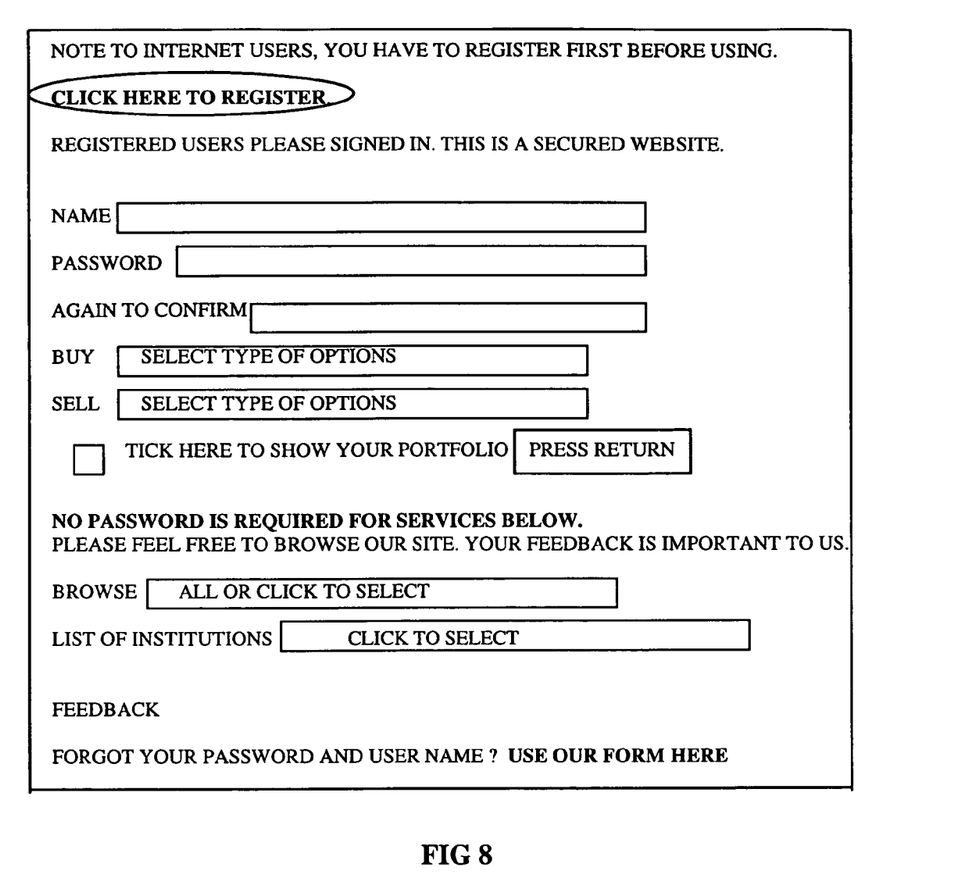
FIG. 8. Depicts the WWW page interface format.

FIG. 8 depicts the format of the World Wide Web interface format. With this availability, any qualified person may access the central controller 20 through the Internet 5 by using ISP Gateway 6. While it is freely available to the public, as shown here, functional access is still very much controlled by central controller 20.

While the above description contemplates the creation, buy, sale, transfer of an option with a fixed expiration date at a particular price, alternative pricing configurations may also be used. After the respective carriers issue an option, they can reserve space in the route covered by the option, and cancel the reservation when the option expires without being exercised. For air-cargo, the options shall expire 6 hours before the schedule departure so it gives time for the carriers to make final adjustments.

Alternatively, they can do nothing until the option is exercised, and at that point reserve the customer's requirements as per the contract made. If this result in overbooking, then the carriers will need to re-arrange some of its schedule to accommodate the contracted air cargo. The control is always with the provider of these services since they are the sellers of these options. That is to say, they can limit the remaining space for a particular route when it is near capacity by raising the price of options. What is more satisfying here is to recognise the option facility here is an hedge against rising cost of freight fees for users, provide some market forces to determine its pricing, help to secure profits for these providers and to plan for resources allocation.

INDUSTRIAL APPLICATION

This system according to the invention possesses several advantages over existing arrangements in reducing the cost of funding and improves the cargo intake in targeting the right users. It also attracts more audience by providing incentives such as discounts (discount here refers to the cost of money over time) or at least by locking in the cost of freight services. This may not be so significant now but as the technology evolved, there will be opportunities for would be users to tailor all their requirements with the carriers' systems to give a complete service cycle. The increased network economy means such design will enhance knowledge gathering including transparency and decision making for the carriers and their customer reducing any wastage and inefficient. Unlike traditional method of income for carriers which uses a deferred billing system, guesswork and inputs from sales dept, the up-front premium is an easier and less intrusive means of securing funds. It will also allow they to make a more informed decision about the potential clients' interest and plan for their coming. Furthermore, this structure is much more cheaper and less administratively consuming. As this is an interactive and automated system with minimal human intervention, the users will always have control and can determine when they can buy/sell, how much to take and when to stop. There will be some form of control within the system design to prevent abuse such as those found in the stock market. This invention is designed to be scaleable and without much mechanical moving parts will be robust.

While the present invention has been described above in terms of specific embodiments, it is to be understood that the invention is not limited to the disclosed embodiments. The present invention is intended as an actionable framework for various modifications and equivalent structures included within the spirit and scope of the appended claims. In particular, similar design is noted for ship cargo, space cargo and rail cargo.

I, the inventor claims:

1. An interactive electronic cargo option exchange for cargo service providers to mange cargo freight fees between registered users and cargo service providers by electronically determining the price for cargo option and for existing cargo option to be sold, bought and settled comprising:
    a central controller including a CPU, database and a memory operatively connected to said CPU;
    at least one service provider's cargo system including a CPU and a memory operatively connected to said CPU, said cargo system adapted for communicating with said central controller over a network;
    said memory in said cargo system containing a program means for calculating, selecting, and responding adapted to be executed by said cargo system's CPU;
    a plurality of terminal devices, adapted for communicating with said central controller, for transmitting to said central controller user cargo shipping information comprising at least: remaining payment, destination of cargo, arrival date of cargo, flexibility of arrival date, type of cargo, departure date, departure location and route criteria over a network;
    wherein said cargo system calculating means uses at least, remaining payment, time period to provide service, current cargo service cost for a selected route to determine the base price, calculating standard deviation of cargo service price;
    wherein said cargo system selecting means uses at least, destination of cargo, arrival date of cargo, flexibility of arrival date, type of cargo, departure date, departure location, weather conditions, loading capacity, demand for this type of cargo space, timing issues, cargo price and route criteria to determine availability of service;
    if service is available said cargo system responding means to provide cargo pricing information to central controller;
    said memory in said central controller containing a program to calculate cargo option price, adapted to be executed by said CPU in response to cargo pricing information from cargo system;
    wherein said central controller receives said user shipping information criteria from said terminal and query at least one service provider's cargo system over a network;
    wherein said central controller is connected to a database comprising users account information, including past transaction records of any sale and purchase of cargo option, cargo prices, user personal details including banking accounts, transaction amounts, type of cargo, transporter, departure destination, arrival destination, said accounts are protected by passwords and login sequence; and
    said central controller having searching means to match and rank existing cargo options set by user, means to display with a graphic user interface and means to receive a user request input via said terminal an offer for sale or buy cargo option, and means to receive cargo system request which are posted for a predetermined period accessible online to other users, in said exchange.

2. The exchange according to claim 1, wherein said program in said central controller's memory means to receive a user request input via said terminal device to perform a payment transaction through a nominated bank account to sell or buy the posted cargo options on behalf of said user.

3. The exchange according to claim 1, wherein said program in said central controller's memory means to receive a registered user request input via said terminal device to settle user's cargo option contract and further means to perform a payment transaction through a nominated bank account to pay cargo service provider the remaining payment to secure the underlying contracted cargo services and further means to update both registered user's and service provider's accounts in the database.

4. A computer implemented system for deter cargo option price for freight services over a network connected to a central controller linked to a plurality of terminals comprising:
    at least one cargo system;
    having a CPU in service provider's cargo system;
    having a memory in cargo system means connected to said CPU, said memory means containing a program adapted to be executed by said CPU;
    having said CPU and memory in cargo system means to determine cargo pricing information, determining suitability of the shipping information inputted by user and means to response cargo pricing information to central controller; having a CPU in the central controller;
    having a memory in central controller means connected to said CPU, said memory means containing a program adapted to be executed by said CPU;

having said CPU and memory in response to cargo pricing information received from at least one cargo system, means electronically calculate cargo option price wherein calculate is based at least in part on the formula below;

Cargo Option price=$LC*D*L*C*R*V*W*Q*A*CO$ where LC is the load capacity times the base price for the option, D is related to a desired number of weeks before departure date, L is concerning the cargo space demand on the requested route, C is concerning loyalty, R is concerning flexibility, V is concerning the standard deviation of the cargo prices, W is concerning the weather on the departure date, Q is for type of cargo including weight and dimensions, A is for type of carrier and CO is for number of competition on the same route; and having said CPU and memory means outputting the cargo option price for consideration by user and update the database where said cargo option is available for predetermined period to other users if not selected by first user.

5. The system according to claim 4, wherein shipping information comprising at least one of the first information concerning destination of cargo, second information concerning arrival date of cargo, third information concerning departure location, fourth information concerning departure date, fifth information concerning flexibility of arrival date and sixth information concerning type of cargo.

6. The system according to claim 4, wherein said cargo pricing information comprising: first information describing a number of weeks before departure, second information concerning the demand of this type of cargo space, third information concerning the standard deviation of the cargo prices for the route, fourth information on the current cargo price, fifth information on the flexibility of the cargo arrival date, sixth information on the loading capacity of the transporter, seventh information on the predicted weather prevailing on the date of departure and arrival, eighth information on the timing of the transporter, ninth information on the type of cargo, tenth information on the type of transporter selected, eleventh information on the route, twelfth information on the remaining payment.

7. The system according to claim 4, wherein central controller is an electronic cargo option exchange and whereby cargo is serviced by air, rail, sea or space carriers.

8. The system according to claim 4, wherein the said program in said memory in central controller comprising:
   means to receive a user request to settle user's cargo option;
   means to verify the validity of the cargo option;
   means to perform a payment transaction to pay remaining payment to the cargo service provider responsible for providing the cargo service; and
   means to update the database to reflect the payment in settlement for cargo service in both user and cargo service provider's accounts.

9. A method for determining cargo option for freight services over a network connected to a central controller linked to at least one service provider cargo system and a plurality of terminals, comprising the steps of:
   at the central controller;
   in response to cargo pricing information received from provider's cargo systems; calculating the cargo option price wherein said calculating is based at least in part on the formula below;

Cargo Option price=$LC*D*L*C*R*V*W*Q*A*CO$ where LC is the load capacity times the base price for the option, D is related to a desired number of weeks before departure date, L is concerning the cargo space demand on the requested route, C is concerning loyalty, R is concerning flexibility, V is concerning the standard deviation of the cargo prices, W is concerning the weather on the departure date, Q is for type of cargo including weight and dimensions, A is for type of carrier and CO is for number of competition on the same route; and outputting the cargo option price to the user and update the database where said priced cargo option is available for predetermined period to other users if not selected by first user.

10. The method according to claim 9, includes the step of receiving user's cargo shipping information comprising at least one of the first information concerning destination of cargo, second information concerning arrival date of cargo, third information concerning departure location, fourth information concerning departure date, fifth information concerning flexibility of arrival date, sixth information concerning type of cargo and seventh information concern route criteria provided by a user; and
   a step querying at least one cargo system with said user's shipping information.

11. The method according to claim 9,
   wherein cargo pricing information comprising: first information describing a number of weeks before departure, second information concerning the demand of this type of cargo space, third information concerning the standard deviation of the cargo prices for the route, fourth information on the current cargo price, fifth information on the flexibility of the cargo arrival date, sixth information on the loading capacity of the transporter, seventh information on the predicted weather prevailing on the date of departure and arrival, eighth information on the timing of the transporter, ninth information on the type of cargo, tenth information on the type of transporter selected, eleventh information on the route, twelfth information on the remaining payment.

12. The method according to claim 9, further comprising:
   the steps of receiving an indication tat a user has purchased or sold the cargo option;
   updating a customer database to record the sale or purchase of the cargo option; and posting transaction details accessible by all users.

13. The method according to claim 9, further comprising the step of:
   receiving a user's request in the form of shipping information to purchase an existing cargo option;
   scanning for any other ready seller matching at that price or lower in cargo option database accessible to all users;
   if available, performing a payment transaction through a nominated bank account by electronic instructions connected to the bank to pay the seller;
   storing information regarding said cargo option contract until expiry or settled which ever is first in the contracted parties respective accounts; and
   posting the transaction details which is accessible to all users over the network.

14. The method according to claim 13, wherein the step of receiving shipping information comprising: receiving the range of possible dates of departure, destination, departure location, dates of arrival, range of possible settlement price or remaining payment, type of cargo and flexibility of arrival dates for this route criteria, range of cargo option prices acceptable and a selection of cargo service providers.

15. The method according to claim 9, further comprising the steps of:
   receiving a user's request to settle user's cargo option;
   verifying the validity of the cargo option;
   if verified ask user to perform a payment transaction to pay remaining payment to the service provider responsible for providing the cargo service;

updating the database to reflect the settled cargo service in both the said user's and service provider's accounts; and posting settlement details accessible to all users over the network.

16. The method according to claim 9 whereby the central controller is an electronic cargo option exchange.

17. A computer-readable medium storing computer executable program implementing the method of claim 9.

* * * * *

UNITED STATES PATENT AND TRADEMARK OFFICE
CERTIFICATE OF CORRECTION

PATENT NO.         : 6,990,467 B1                                   Page 1 of 1
APPLICATION NO. : 09/376381
DATED              : January 24, 2006
INVENTOR(S)        : Khai Hee Kwan It is certified that error appears in the above-identified patent and that said Letters Patent is hereby corrected as shown below:

In Claim 1, please cancel the text "mange" in column 11, line 49, and insert --manage--.

In Claim 4, please cancel the text "deter" in column 12, line 52, and insert -- determining--.

In Claim 12, please cancel the text "tat" in column 14, line 36, and insert --that--.

Signed and Sealed this

Ninth Day of January, 2007

JON W. DUDAS
*Director of the United States Patent and Trademark Office*